US007931310B2

(12) United States Patent
Lake

(10) Patent No.: US 7,931,310 B2
(45) Date of Patent: Apr. 26, 2011

(54) PIPE COUPLER

(75) Inventor: Robert C. Lake, Bakersfield, CA (US)

(73) Assignee: Western Oilfields Supply Co., Bakersfield, CA (US)

( * ) Notice: Subject to any disclaimer, the term of this patent is extended or adjusted under 35 U.S.C. 154(b) by 0 days.

(21) Appl. No.: 12/401,598

(22) Filed: Mar. 10, 2009

(65) Prior Publication Data

US 2010/0230949 A1 Sep. 16, 2010

(51) Int. Cl.
F16L 23/00 (2006.01)

(52) U.S. Cl. ......... 285/365; 285/111; 285/364; 285/409

(58) Field of Classification Search ................. 285/111, 285/112, 364, 365, 366, 367, 368, 409, 311, 285/312; 24/270, 273
See application file for complete search history.

(56) References Cited

U.S. PATENT DOCUMENTS

| 2,219,161 | A | * | 10/1940 | Jacobs | 285/365 |
|---|---|---|---|---|---|
| 3,113,791 | A | * | 12/1963 | Frost et al. | 285/112 |
| 3,476,410 | A | * | 11/1969 | Pastva, Jr. | 285/112 |
| 3,828,403 | A | * | 8/1974 | Perrin et al. | 24/270 |
| 3,999,825 | A | * | 12/1976 | Cannon | 439/192 |
| 4,008,937 | A | * | 2/1977 | Filippi | 439/192 |
| 4,249,786 | A | * | 2/1981 | Mahoff | 439/192 |
| 4,346,428 | A | * | 8/1982 | Gale | 361/215 |
| 4,969,923 | A | * | 11/1990 | Reeder et al. | 285/365 |
| 5,366,263 | A | * | 11/1994 | Hendrickson | 285/364 |
| 5,380,052 | A | * | 1/1995 | Hendrickson | 285/364 |
| 5,586,367 | A | * | 12/1996 | Benoit | 24/68 SK |
| 5,722,666 | A | * | 3/1998 | Sisk | 277/615 |
| 7,004,512 | B2 | * | 2/2006 | Antonelli et al. | 285/365 |
| 2004/0061335 | A1 | * | 4/2004 | Mills | 285/409 |
| 2005/0184524 | A1 | * | 8/2005 | Stravitz | 285/903 |
| 2005/0253383 | A1 | * | 11/2005 | Gibb et al. | 285/112 |

* cited by examiner

Primary Examiner — James M Hewitt
(74) Attorney, Agent, or Firm — Holland & Knight LLP; Richard E. Lyon, Jr.

(57) ABSTRACT

A coupler for use with a sealing member for releasably securing together adjacent ends of grooved end pipe and forming a fluid-tight seal therebetween. The coupler includes a pair of arcuate segments, each segment having a generally inverted U-shaped cross-section so as to define a pair of depending leg portions and an outer spanning wall extending therebetween, each of the coupling segments further defining first and second end portions. The first end portions of each arcuate segment are joined together in a pivotal connection. A closure including a bail pivotally mounted on a release/locking lever, an attachment hook and a pair of abutment surfaces is provided at the second end portions of the arcuate segments for releasably joining and securing together the second end portions of the segments about the sealing gasket and adjacent pipe ends with the leg portions of the segments projecting into the grooves therein.

6 Claims, 4 Drawing Sheets

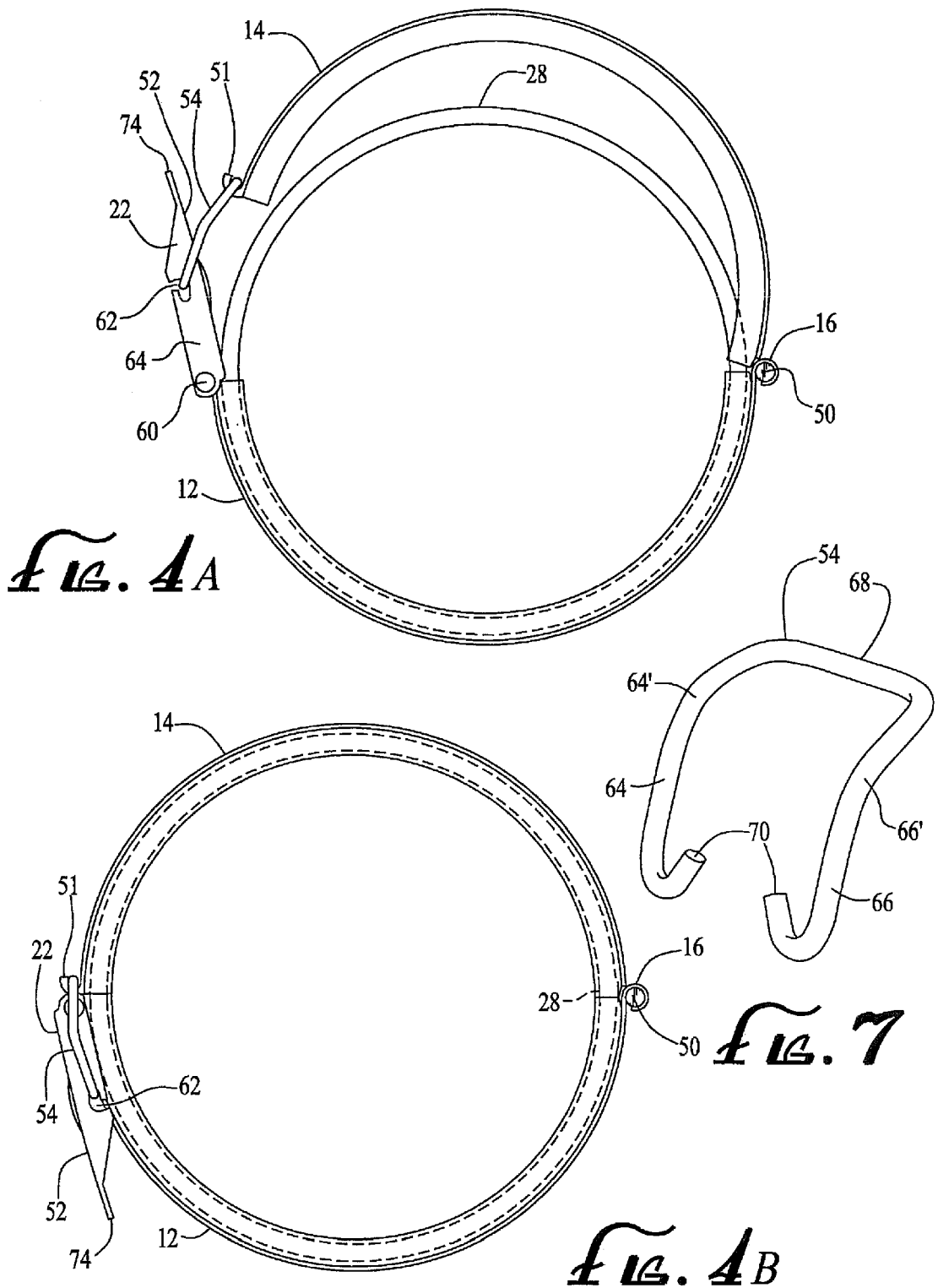

PIPE COUPLER

BACKGROUND OF THE INVENTION

The present invention relates to a coupling for releasably securing adjacent lengths of grooved end pipe so as to provide a fluid-tight seal therebetween in a pressurized line. Currently, there are numerous configurations of couplings from mechanically joining together lengths of such pipe in pressurized applications that provide a fluid-tight seal between adjacent pipe sections. Typically, such devices comprise a pair of arcuate sections, generally of a U-shape in cross-section that are disposed about an annular gasket spanning the adjacent pipe ends and are secured together by threaded fasteners with the inwardly extended ends of the arcuate coupler sections being disposed within the end grooves of the pipe sections. An example of such a device is manufactured by Victaulic Company as a standard flexible coupling, Style S77. While such devices are durable and provide excellent securement of the pipe sections and the desired fluid-type seal, they are relatively heavy, expensive to manufacture and time consuming to install. The weight and cost of such couplings is particularly significant on the larger size couplings. For permanent installations, the weight, cost and ease of installation is of lesser concern. However, such pipe couplings are also frequently used in temporary or rental applications where the fluid line is set up for a limited period of time, e.g. in pressurized waste-water pipelines. In such applications a large number of such couplings are often employed and the cost, weight and the time it takes one to effect the securement and removal of the couplings become economically significant. The present invention provides a pipe coupling particularly adapted for such applications.

SUMMARY OF THE INVENTION

Briefly, the present invention comprises a releasable coupler for use with an annular sealing member for mechanically securing together in a fluid-tight attachment adjacent lengths of grooved end pipe in a pressurized liquid pipeline. The coupler of the present invention preferably comprises a pair of arcuate coupling segments having a generally inverted U-shaped cross-section so as to define a pair of inwardly projecting pipe engaging legs and an outer spanning wall. A hinged connection is provided between two adjacent ends of the coupler segments and a releasable closure is provided at the other ends thereof for releasably securing the coupler segments together in a substantially circular end-to-end relationship about the annular sealing member and adjacent pipe ends and with the inwardly directed engaging legs on the coupler segments disposed within the grooves in the end portions of the adjacent pipe lengths.

A preferred embodiment of the closure for releasably securing the arcuate segments of the coupler in place about the sealing member and adjacent pipe ends comprises an attachment hook formed in an end portion of one of said coupler segments, a lever pivotally mounted on an end portion of the other coupling segment and a U-shaped bail carried by the lever and adapted to engage the attachment hook and draw together the two adjacent ends of the coupler segments as the lever is pressed inwardly against the spanning wall of the other coupler segment, thereby releasably securing the adjacent pipe lengths together and forming a fluid-tight seal therebetween.

BRIEF DESCRIPTION OF THE DRAWINGS

FIGS. 4A and 4B are side views illustrating the operation of the closure mechanism of the coupler of the preferred embodiment of the coupler of the present invention.

FIG. 7 is a perspective view of a preferred configuration of a locking bail for use in the pipe coupler of the present invention.

DETAILED DESCRIPTION OF A PREFERRED EMBODIMENT

Figure 1:
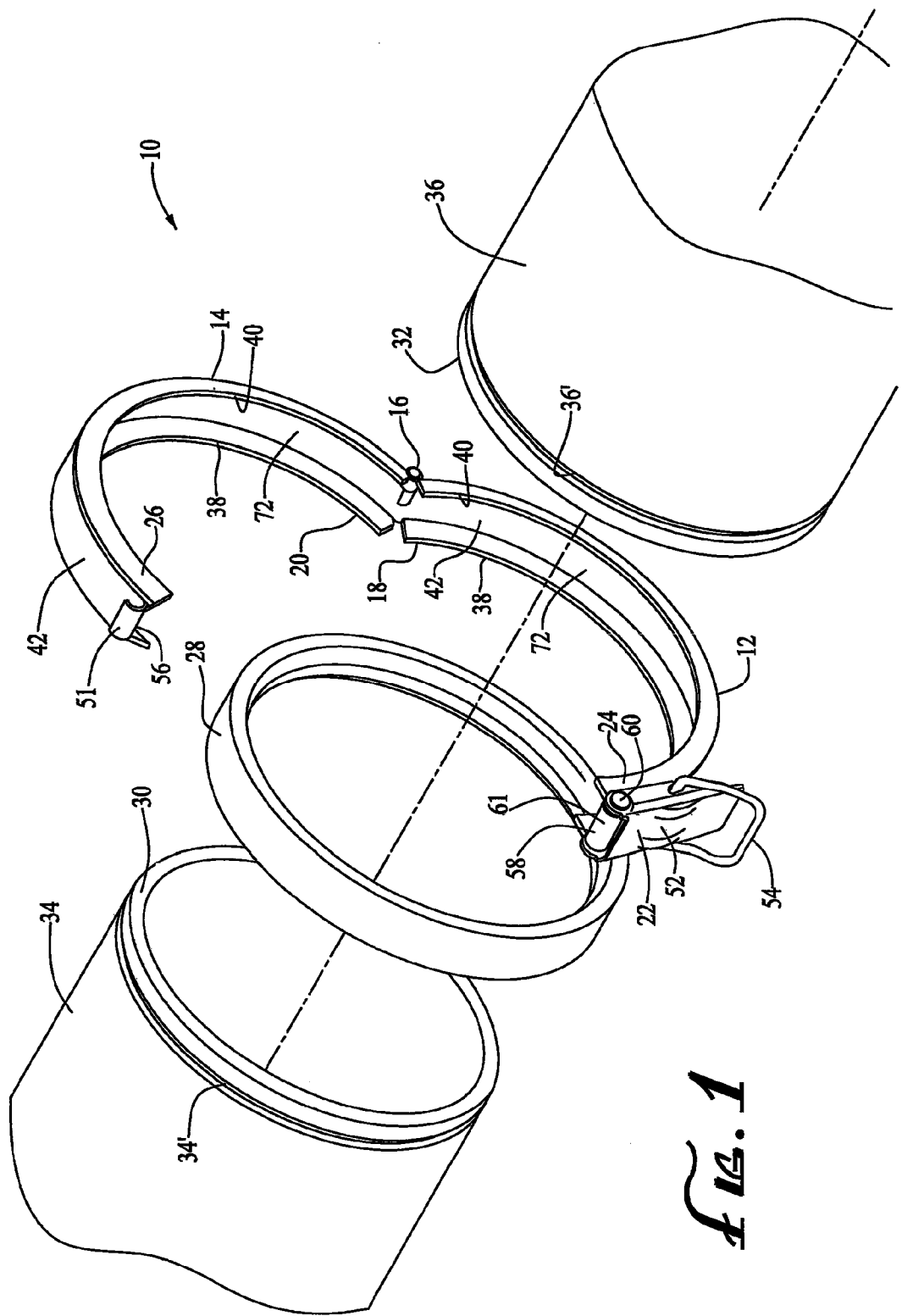
FIG. 1 is a perspective view of a preferred embodiment of the coupler of the present invention and end portions of two grooved-end pipe sections.
Figure 2:
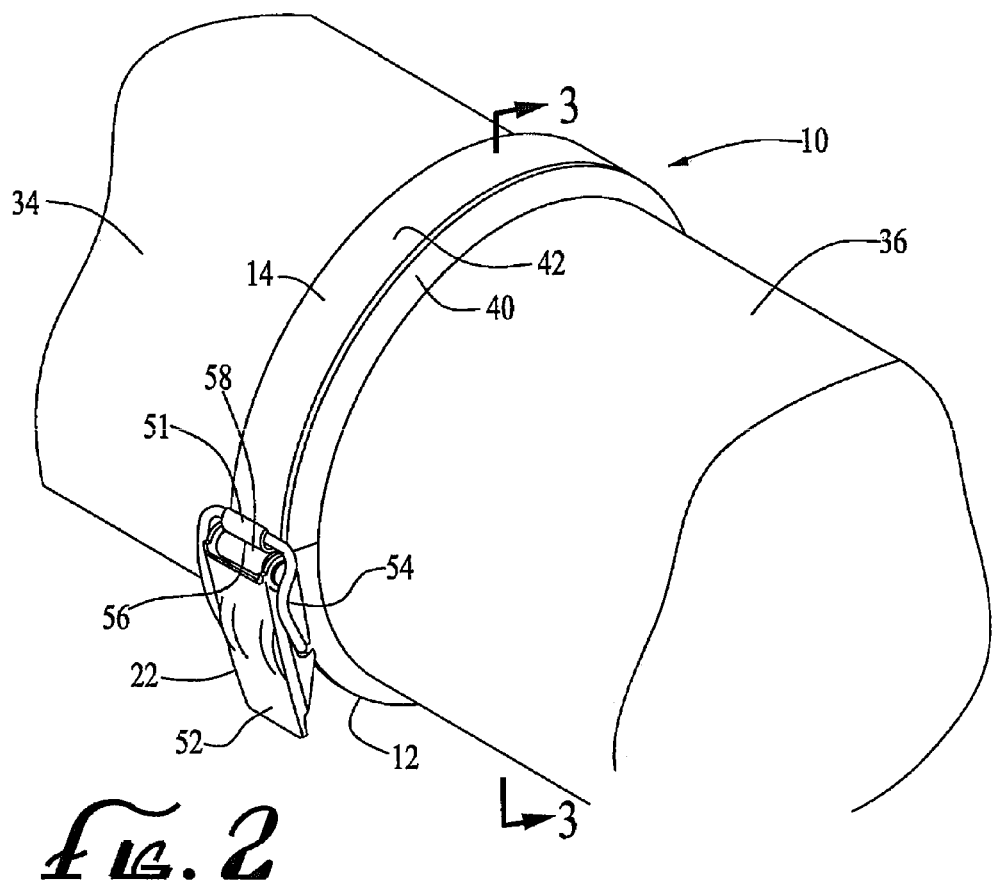
FIG. 2 is a perspective view of a preferred embodiment of the coupler of the present invention disposed about and securing together adjacent lengths of grooved end pipe.

Referring now in detail to the drawings, the coupler 10 of the present invention comprises a pair of arcuate segments 12 and 14 secured together in a pivotal connection 16 at extended adjacent ends 18 and 20 thereof and a closure 22 for releasably drawing together and securing the opposed segment ends 24 and 26. In use, the coupler 10 extends about and presses a sealing member 28 inwardly the adjacent ends 30 and 32 of a pair of grooved end pipe sections 34 and 36 while inwardly extending leg portions 38 and 40 of the coupler segments project into the circumferential grooves 34' and 36' adjacent the pipe ends 30 and 32, as will be described.

Figure 3:
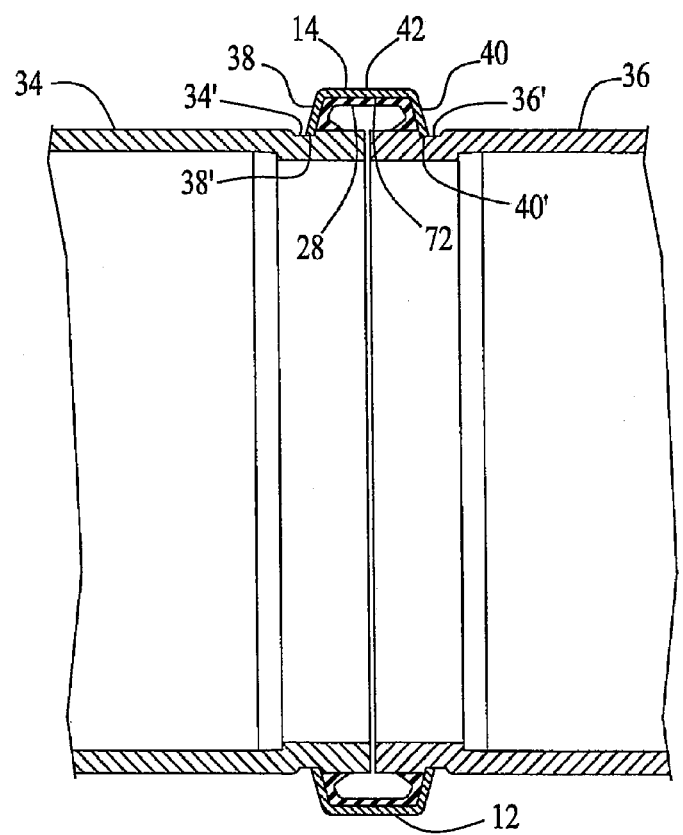
FIG. 3 is a sectional view taken along the line 3-3 in FIG. 2.
Figure 5A:
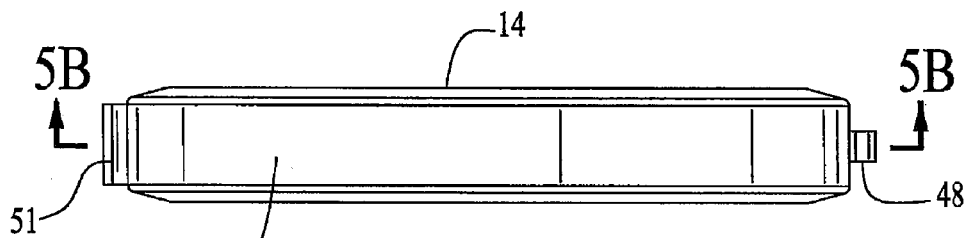
FIG. 5A is an end view of one of the arcuate segments of a preferred embodiment of the coupler of the present invention.
Figure 5B:
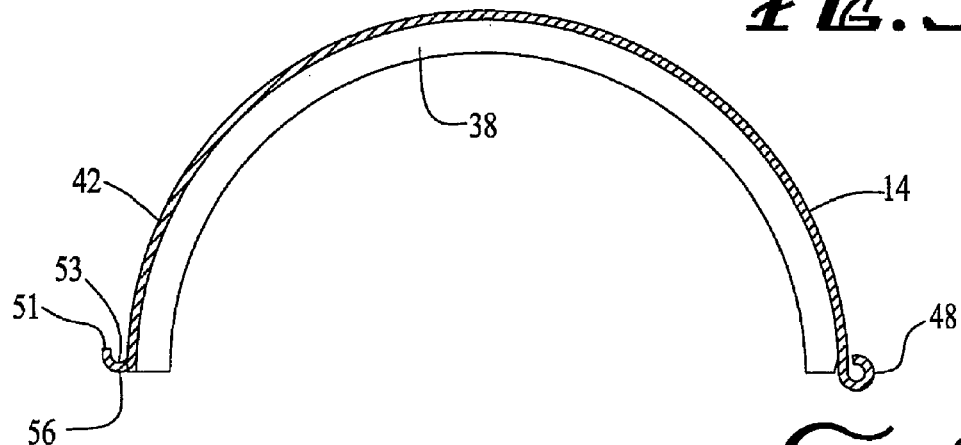
FIG. 5B is a sectional view taken along the line 5B-5B in FIG. 5A.
Figure 6A:
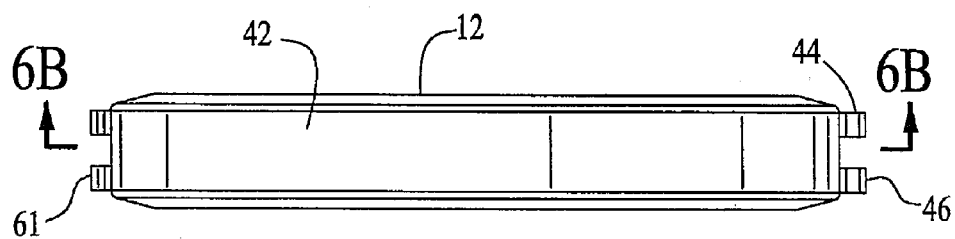
FIG. 6A is an end view of the other arcuate segment of a preferred embodiment of the coupler of the present invention.
Figure 6B:
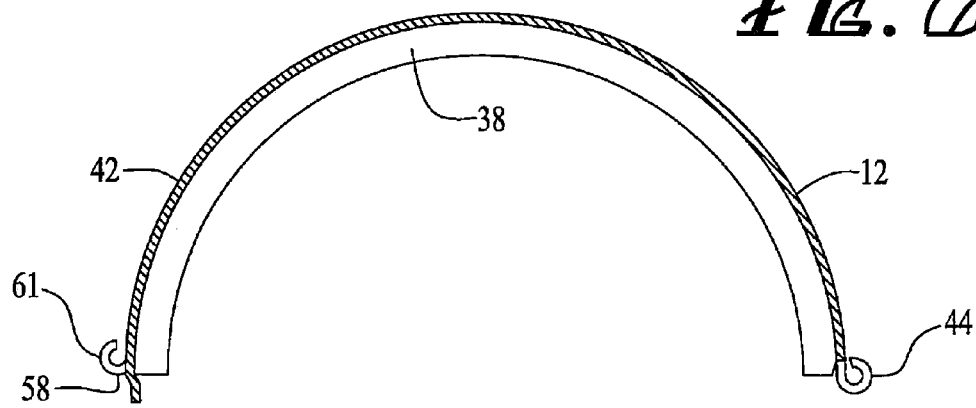
FIG. 6B is a sectional view taken along the line 6B-6B in FIG. 6A.

In a preferred embodiment of the present invention, the coupler segments 12 and 14 are substantially identical in configuration, generally formed of 6-12 gauge galvanized or stainless steel stampings, or other alloys, and are generally of a U-shaped configuration in cross-section so as to define a pair of laterally-spaced, inwardly directed flanges 38 and 40 and an outer spanning wall 42. The flanges 38 and 40 define pipe engaging legs and are spaced apart a predetermined distance depending on the diameter of the grooved end pipe with which the coupler 10 is to be used. For example, in 10 in. diameter grooved end pipe, the grooves are disposed 0.75 inches from the pipe ends. Accordingly, in a coupler 10 sized for use with such pipe, the flanges or leg portions 38 and 40 of the coupler would be spaced about 1.6 inches apart such that the extended ends 38' and 40' of the pipe coupler legs will extend into the aligned grooves 34' and 36' in the adjacent pipe lengths (see FIG. 3). Because the distance between the circumferential groove and the pipe ends in grooved end pipe are standardized by ANSI/AWWA C-606, Standard for Grooved and Shouldered Type Joints and CSA 242 M1980, the couplers 10 can be readily sized for use with such pipe. The grooves can be machined or rolled into the pipe or cast into a fitting welded or otherwise attached to the pipe.

In the illustrated embodiment, the pivotal connection 16 between coupler segments 12 and 14 is defined by rolling end portions of the two coupler segments into mating curvilinear hinge sections. As seen in FIGS. 5A-6B, laterally spaced hinge sections 44 and 46 are formed at the extended end of coupler segment 12 and a projecting end portion of segment 14 is formed into a center hinge section 48. Hinge section 48 is sized relative to sections 44 and 46 so as to fit therebetween in lateral alignment and a rivet or other suitable hinge pin 50 extends through the aligned hinge sections to form the pivotal connection 16. Other hinge configurations could, of course, be employed to provide the desired hinged or pivotal connection of the two coupler sections 12 and 14.

The releasable closure 22 is positioned at the opposed ends of coupler segments 12 and 14 from pivot connection 16 and, in the preferred embodiment, comprises an attachment hook 51, lever 52, bail 54 and bearing surfaces 56 and 58. The attachment hook 51 is positioned at an extended end of coupler segment 14 and is preferably formed by rolling an extended end portion of the spanning wall 42 of segment 14 outwardly and rearwardly along a curvilinear path so as to define hook 51. So configured, hook 51 defines an opening 53 and a first curvilinear bearing surface 56. An extended end portion of the spanning wall 42 of arcuate segment 12 is similarly rolled outwardly and rearwardly to define with rivet or other suitable hinge pin 60, a pivot mounting 61 for lever 52 and a second curvilinear bearing surface 58. A locking bail 54 is pivotally mounted in lever 52 through slots 62 formed in the depending side walls 64 of the lever as seen in FIG. 4A. As seen in FIG. 7, locking bail 54 defines leg portions 64 and 66, a cross member 68 integrally formed with the leg portions and extending therebetween and hook portions 70 formed at the rearwardly extended ends of the leg portions of the bail that project through and about slots 62 so as to provide a pivotal mounting of the bail with respect to the lever. The leg portions 64 and 66 of the bail are bowed at 64' and 66' as seen in FIG. 7 to provide a spring-loaded locking action for the closure 22.

In use, the ends 30 and 32 of the grooved end pipe sections 34 and 36 are placed in an adjacent disposition and a sealing member 28 is disposed thereover so as to span portions of the pipe ends adjacent the juncture therebetween. Sealing member 28 can be formed of nitrol, EPDM or any other suitable sealing material and can be of single or multi-piece construction. Preferably, an annular gasket defining a C-shaped double lip seal is employed. The sealing member 28 is sized relative to the coupler 10 so that it will fit about the pipe ends and within the channels 72 defined by coupler segments 12 and 14 with the interior surfaces of flanges 38 and 40 and spanning walls 42 abutting the upper surface and side walls of the sealing member 28. The opened coupler 10 is then placed over and about the sealing member utilizing the pivot connection 16 such that the extended ends 38' and 40' of the pipe coupler legs extend into the aligned grooves 34' and 36' on the adjacent pipe lengths. Upon placing the cross bar 68 of locking bail 54 in attachment hook 51 through opening 53 thereof and pressing the lever 52 rearwardly and downwardly toward the upper surface of arcuate member 12, the bearing surfaces 56 and 58 on arcuate segments 12 and 14 are drawn into abutment. Continued pressure on the lever causes the legs 64 and 66 of the bail 54 to flex and pass over center, locking the coupler ends together in a secured disposition under the spring force of the bail legs and securing the coupler 10 in place about the sealing member 28 and adjacent pipe ends.

To release the secured pipe sections, it is only necessary to force the extended end 74 of the coupler lever 52 upwardly, disengaging the locking bail 54 carried by coupler segment 12 from the attachment hook 51 carried by segment 14. Because of the spring force in the bail, a tool may be required to effect such disengagement. However, the removal of the coupling is still a simple and quick procedure, obviating the need to undue threaded fastening members. As a result of this feature, the relatively lightweight and low cost of construction of coupler 10, the coupling member of the present invention is ideally situated for use in temporary pressurized pipe line situations such as temporary water, sewer, oil and other pipelines used in transporting fluids.

It is to be understood that the above described embodiment of the clamping member of the present invention is an example of a preferred embodiment and that various changes and modifications can be made in carrying out the present invention without departing from the spirit and scope thereof. Insofar as those changes and modifications are within the purview of the appended claims, they are to be considered as part of the present invention.

What is claimed is:

1. A coupler for releasably securing together adjacent ends of grooved end pipe and forming a fluid-tight seal therebetween, said coupler comprising:
    a pair of arcuate coupling segments, each segment having a generally U-shaped cross-section so as to define a pair of depending leg portions and an outer spanning wall extending therebetween, each of said coupling segments further defining first and second end portions;
    a sealing member configured to be disposed within said coupling segments adjacent to said leg portions and outer spanning wall and about adjacent ends of grooved end pipe so as to span portions of the pipe and the juncture therebetween;
    a pivotal connection joining together said first end portions of said coupling segments; and
    a closure for releasably joining together said second end portions of said coupling segments about the sealing member and adjacent ends of pipe with said spanning wall and leg portions of said coupling segments bearing against said sealing member and said leg portions projecting into grooves proximate said adjacent ends of pipe and preventing longitudinal separation of said adjacent ends of pipe, said closure including an attachment hook defined by a second end portion of one of said coupling segments, a lever pivotally mounted on a second end portion of the other of said coupling segments, a bail pivotally mounted on said lever and a pair of curvilinear bearing surfaces, each of said surfaces one of which being defined by said attachment hook, being of single-piece construction with one of said coupling segments and defined by a curvilinear extension of the respective one of said second ends portions thereof whereby upon disposing said bail about said attachment hook and urging said lever away from said hook and toward said outer spanning wall of the other of said coupling segments, said bearing surfaces are drawn into and maintained in a spring-loaded abutment to effect a releasable securement of said coupling about the sealing member and adjacent pipe ends.

2. The coupler of claim 1 wherein said pivotal connection comprises a hinge pin and extensions of said spanning walls projecting from each of said first end portions of said coupling segments about said hinge pin.

3. The coupler of claim 2 wherein said attachment hook is of single-piece construction with the curvilinear extension of said one of said second end portions.

4. The coupler of claim 1 wherein each of said coupling segments is of single-piece construction and including first and second hinge pins, portions of said spanning walls projecting from said first end portions of said coupling segments being in aligned disposition about said first hinge pin so as to define said pivotal connection and a portion of the spanning wall projecting from said second end portion of the other of said coupling segments being disposed about said second hinge pin and defining a pivotal mounting for said lever on the other of said coupling segments and the other of said curvilinear bearing surfaces.

5. The coupler of claim 1 wherein said bail is of single-piece construction and defines a pair of leg portions, a first end of each of said leg portions of said bail forming a pivotal connection of said bail with said lever, a second end of each of said leg portions of said bail terminating in a cross member portion of said bail extending between said leg portions for engaging said attachment hook, said leg portions of said bail each further defining a bowed configuration between said pivotal connection and said cross member so as to effect said spring-loaded abutment of said bearing surfaces upon said cross member being disposed about said attachment hook and said lever being pivoted away from said hook and inwardly toward said outer spanning wall of said other of said coupling segments.

6. The coupler of claim 4 wherein said bail is of single-piece construction and defines a pair of leg portions, a first end of each of said leg portions of said bail forming a pivotal connection of said bail with said lever, a second end of each of said leg portions of said bail terminating in a cross member portion of said bail extending between said leg portions for engaging said attachment hook, said leg portions of said bail each further defining a bowed configuration between said pivotal connection and said cross member so as to effect said spring-loaded abutment of said bearing surfaces upon said cross member being disposed about said attachment hook and said lever being pivoted away from said hook and inwardly toward said outer spanning wall of said other of said coupling segments.

* * * * *